United States Patent [19]

Kottke

[11] Patent Number: 4,807,924

[45] Date of Patent: Feb. 28, 1989

[54] FOLDING CAMPER FOR PICK-UP TRUCKS

[76] Inventor: Gene R. Kottke, Rt. 2, Box 575, Big Sandy, Tex. 75755

[21] Appl. No.: 121,167

[22] Filed: Nov. 16, 1987

[51] Int. Cl.⁴ ............................................. B60P 3/37
[52] U.S. Cl. .................................. 296/164; 296/174; 296/27; 52/71
[58] Field of Search ........................ 296/164, 173, 27; 52/71, 69

[56] References Cited

U.S. PATENT DOCUMENTS

| | | | |
|---|---|---|---|
| 3,000,664 | 9/1961 | Martin | 296/164 |
| 3,429,608 | 2/1969 | Farnum | 296/27 |
| 3,807,104 | 4/1974 | Webster | 52/71 |
| 4,027,912 | 6/1977 | Pacca | 296/164 |

Primary Examiner—Robert R. Song
Attorney, Agent, or Firm—John M. Harrison

[57] ABSTRACT

A folding camper for mounting in a pick-up truck, which camper includes a base frame shaped to mount in the bed of the pick-up truck, a pair of roof panels hinged to the sides of the base frame and adapted to fold inwardly, one upon another and a pair of triangular-shaped front and rear panels hinged to the front and rear ends of the base frame, respectively, and also adapted to fold inwardly, one upon the other. In a preferred embodiment of the invention, the front and rear panels are adapted to fold inwardly on the base frame in sequence and the left and right-hand roof panels are designed to then fold on the front and rear panels in sequence, in order to orient the folding camper in traveling mode. In another preferred embodiment, a window is fitted in the front panel and a door section and door are provided in the rear panel, which door matches a cooperating door section and door located in the rear segment of the base frame, wherein the matching doors can be opened and closed in concert when the folding camper is deployed in the bed of the pick-up truck.

21 Claims, 2 Drawing Sheets

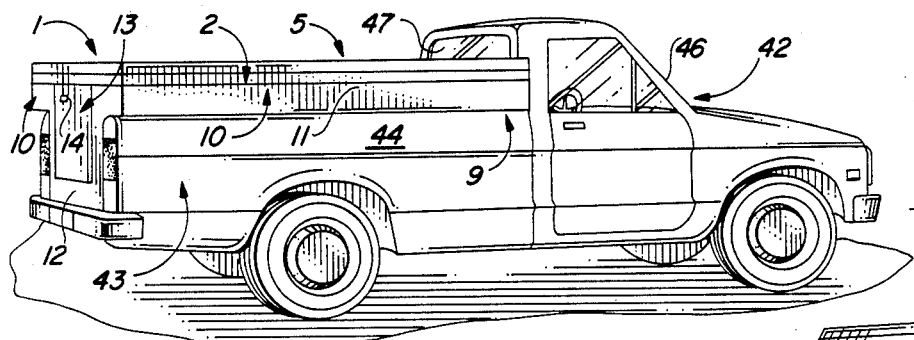
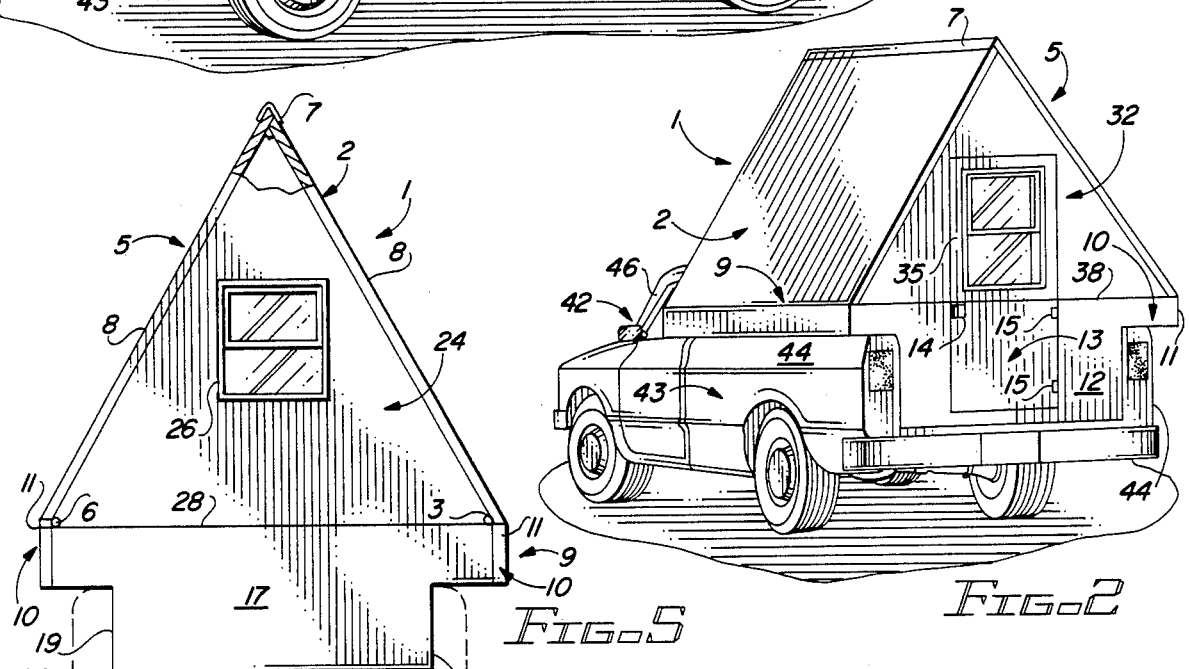
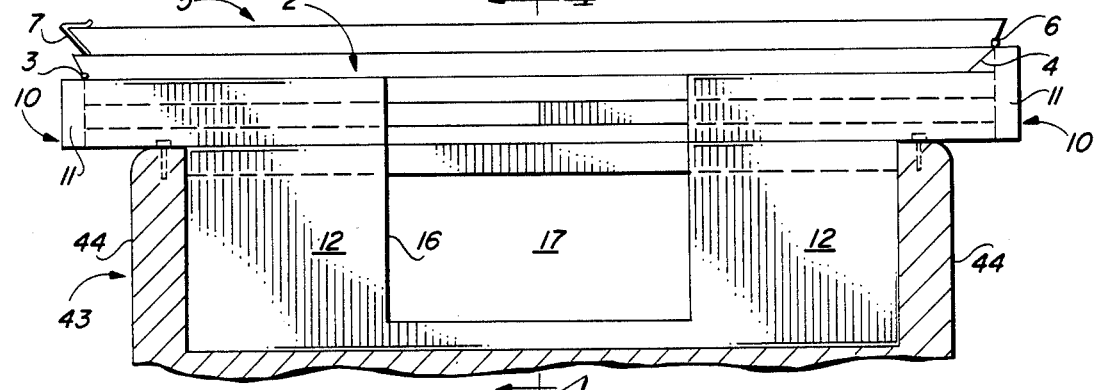
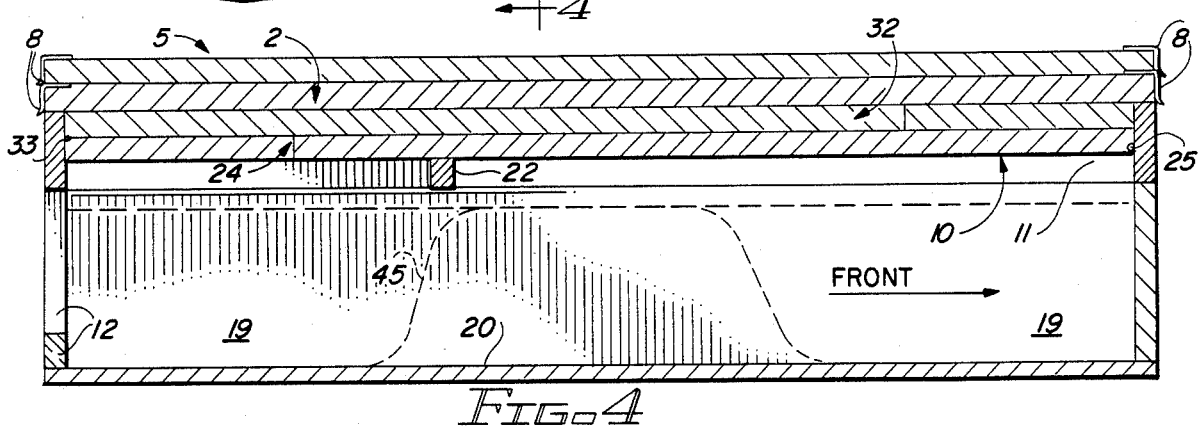

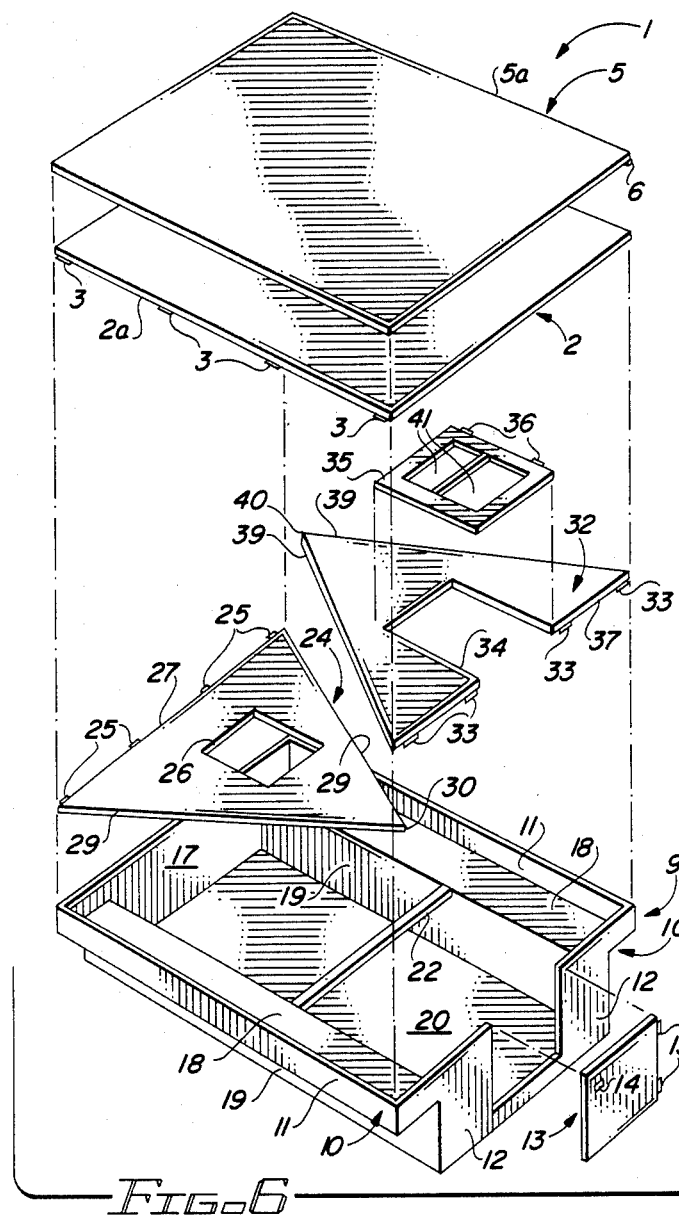
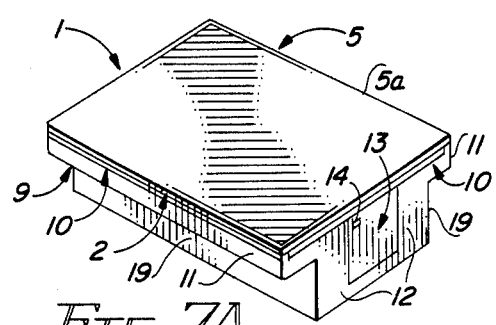
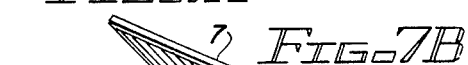
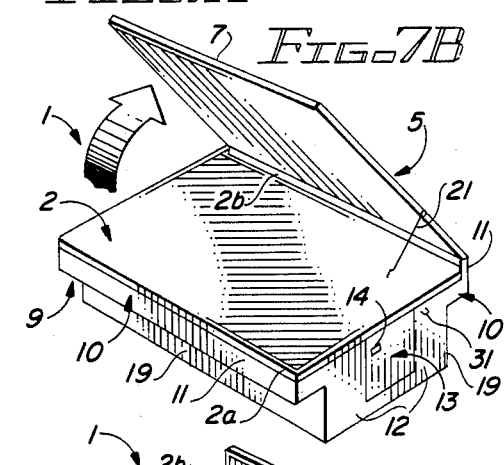
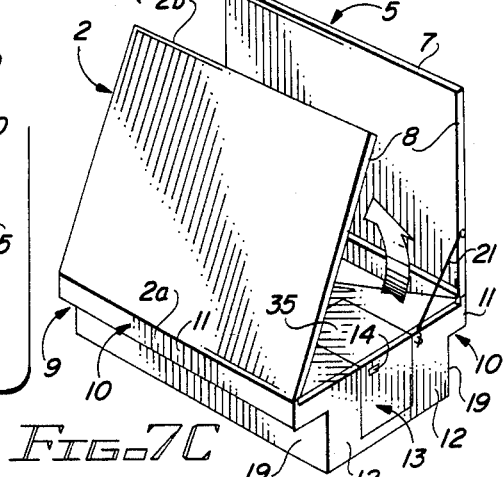
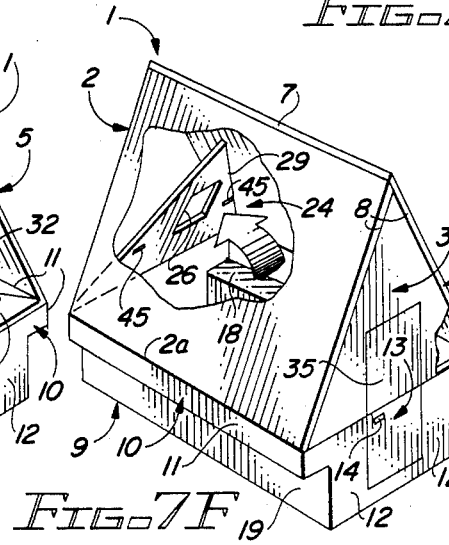
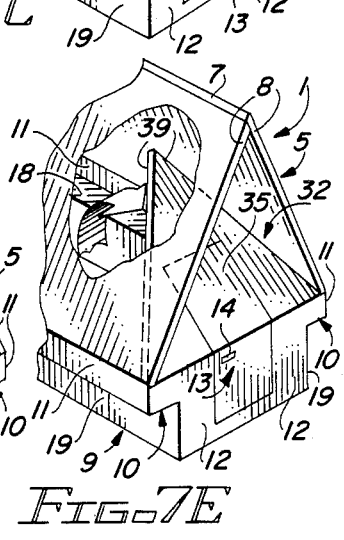

FOLDING CAMPER FOR PICK-UP TRUCKS

CROSS-REFERENCE TO DISCLOSURE DOCUMENT

This invention was documented in the U.S. Patent and Trademark Office Disclosure Document Program by instrument No. 170291, dated May 18, 1987.

BACKGROUND OF THE INVENTION

1. Field of the Invention

This invention relates to campers for pick-up trucks and more particularly, to a folding camper for pick-up trucks, which folding camper is characterized by a base frame designed to fit in the bed of a pick-up truck, a pair of folding roof panels hinged to the sides of the base frame and adapted to fold inwardly when in transport mode and deploy upwardly as an A-frame when in functional mode. Companion front and rear end panels are hingedly attached to the front and rear edges of the base frame, respectively, and are designed to close the A-frame structure created by the upward-standing roof panels when the folding camper is deployed in functional configuration. In a preferred embodiment, a window is provided in the front panel and an upper door is located in the back panel for matching a corresponding lower door fitted in the rear panel of the base frame, to facilitate access to the folding camper interior.

Camping has long been a popular pastime, not only in this country but in other countries of the world. Many campers enjoy the use of portable tents which may be easily carried to and from the campsite and set up to protect the occupants during inclement weather. Other campers prefer the popular aluminum camper shell which is designed to fit in the bed of a pick-up truck and is provided with a door and windows. Such campers are typically removed from the bed of the pick-up truck and stored when not in use, but may be left on the pick-up truck for any desired period of time.

Typical of the campers which are known in the prior art are those detailed in the following patents, copies of which are provided: The first of these is the "Semi-Collapsible Camping Shelter" disclosed in U.S. Pat. No. 2,788,238, dated Apr. 9, 1957 to E. L. Baird. The camping shelter detailed in this patent is designed to fit in the bed of a pick-up truck and includes opposed, fixed upright end walls, one of which end walls features a door substantially coextensively vertically with the wall. Fixed lower side walls connect the end walls in spaced relationship and upper side walls are hinged to the lower side walls for outwardly-swinging movement between a closed vertical position and an open horizontal position. Vertical guide members are carried by the end walls and a roof is provided with fixed depending posts connected to the guide members for vertical sliding movement. Fixed, depending end walls are telescopically arranged with respect to the end walls to substantially cover the upper door section when in a lowered telescoped position. The shelter unit further includes a mechanism interconnecting the upper side walls with the roof, such that movement of the upper side walls into an open horizontal position will raise the roof and telescope the roof end walls upwardly with respect to the end walls. U.S. Pat. No. 3,708,199, dated Jan. 2, 1973, to Norman J. Throssell details a "Collapsible Shelter Unit". The collapsible shelter unit detailed in this patent is also designed to fit in the bed of a pick-up truck and can be unfolded and erected to form a relatively roomy structure which may be used as a tent, or in combination with a pick-up truck, as a camper. The collapsible shelter unit includes a box-like structure having side and end walls to which other panels are hinged, so that the panels can be swung out to form horizontal bedding support shelves projecting laterally from the side walls and upstanding extensions to the end walls. The upstanding end wall extensions are further provided with side wings hinged to the outer side edges thereof and these wings swing out to form end walls for the bedding support shelves. The sides and ends lock together to form a relatively rigid enclosure covered by a fabric top. The fabric top is attached along its side edges to the side panels and its end edges overhang the top edges of the end panels and are drawn down to a snug fit by means of purse strings provided in the fabric. A door is hinged to one of the end walls to permit entry. The unit can be collapsed and folded in on itself to form a compact fully enclosed, weather-tight box. U.S. Pat. No. 3,790,207, dated Feb. 5, 1974, to Dennis Anderson, discloses "Combination Roof and Side Wall Extensions for Vehicular Hauling Beds". The patent details a collapsible vehicle hauling bed construction wherein a pair of panels are respectively hinged along parallel axes to two opposed side walls of a rectangular truck bed and are designed to swing inwardly to inclined abutting positions to form an inverted U-shaped roof. The panels are also designed to swing outwardly to upright positions to form extensions of the opposed side walls. A third panel is hinged along the third axis normal to at least one of the first named axes, the third panel adapted to rotate between a collapsed position beneath the abutting roof panels in an upright position, forming an extension of one of the remaining bed side walls. The collapsible vehicle hauling bed further includes a mechanism for releasably connecting the upright third panel between the upright pair of panels to form a continuous wall extension for three side walls of the hauling bed. A Folding Camper is detailed in U.S. Pat. No. 3,823,974, dated July 16, 1974, to LeRoy K. Patnode. The folding camper detailed in this patent is adapted to be mounted on a vehicle such as a pick-up truck and includes a rectangular frame having two sides, a front and a back and a roof supported on the frame. Opposite side panels enclose a space beneath the roof when the roof is elevated by means of an L-shaped bell crank mechanism.

It is an object of this invention to provide a new and improved folding camper for pick-up trucks which is characterized by a base frame adapted to fit in the bed of a pick-up truck, a pair of roof panels hinged to the sides of the base frame for inward folding against each other on the base frame when in transportation mode and pivoting into upward-standing A-frame configuration when in functional mode, and front and end panels hinged to the front and rear edges of the base frame, respectively, which end panels are adapted to fold inwardly upon each other beneath the roof panels when in transportation mode and pivot upwardly to close the area beneath the roof panels when in functional mode.

Another object of the invention is to provide a new and improved, weather-tight, A-frame folding camper for pick-up trucks, which includes a base frame shaped to removably fit in the bed of a pick-up truck, a pair of roof panels hinged to the sides of the base frame and front and rear panels hinged to the ends of the base frame, respectively, wherein the end panels and roof panels are designed to fold inwardly on the base frame in stacked relationship when in transportation mode and to be deployed upwardly in A-frame configuration when assembled in deployed mode.

A still further object of the invention is to provide a new and improved folding camper for mounting in the bed of a pick-up truck, which folding camper is characterized by a rectangular-shaped base frame adapted to mount in the bed of a pick-up truck, a pair of generally triangular-shaped front and rear panels hinged to the front and rear edges of the base frame and provided with a window and door, respectively, and roof panels hinged to the sides of the base frame and fitted with weather flashing, wherein the front and rear panels and roof panels are designed to fold inwardly in sequential, stacked relationship against the base frame when the folding camper is in transportation mode and to pivot upwardly to define a weather-sealed A-frame configuration when the folding camper is in functional, deployed configuration.

SUMMARY OF THE INVENTION

These and other objects of the invention are provided in a new and improved folding camper which is designed for removable or permanent attachment to a pick-up truck, which folding camper is characterized by a generally rectangular-shaped base frame adapted for seating in the bed of a pick-up truck, right and left-hand, weather stripping-equipped roof panels hinged to the sides of the base frame in parallel relationship, and a pair of generally triangular-shaped front and rear panels provided with a window and door, respectively, and hinged to the front and rear edges of the base frame, such that the front and rear panels and roof panels are foldable on the base frame in sequential, stacked relationship when the folding camper is in transportation mode and may be deployed upwardly in weather-tight A-frame configuration when in functional mode.

BRIEF DESCRIPTION OF THE DRAWING

The invention will be better understood by reference to the accompanying drawing, wherein:

FIG. 1 is a perspective view of the folding camper of this invention mounted in the bed of a pick-up truck in folded, transportation mode;

FIG. 2 is a rear perspective view of the folding camper illustrated in FIG. 1, with the folding camper oriented in deployed, functional configuration;

FIG. 3 is a rear view of the folding camper illustrated in FIG. 1;

FIG. 4 is a perspective view taken along line 4—4 of the folding camper illustrated in FIG. 3;

FIG. 5 is a front end view of the folding camper illustrated in FIG. 2, with the bed of the pick-up truck illustrated in phantom for clarity;

FIG. 6 is an exploded view of the folding camper illustrated in FIGS. 1 and 3;

FIG. 7A is a perspective view of the folding camper illustrated in FIG. 1, with the folding camper removed from the pick-up truck while in folded configuration;

FIG. 7B is a perspective view of the folding camper illustrated in FIG. 7A, with the right hand roof panel deployed upwardly with respect to the underlying left hand roof panel and the base frame;

FIG. 7C is a perspective view of the folding camper illustrated in FIGS. 7A and 7B, with both the left hand roof panel and the right hand roof panel deployed upwardly with respect to the base frame;

FIG. 7D is a perspective view of the folding camper illustrated in FIGS. 7A-7C, with the roof panels deployed in functional A-frame configuration according to a preferred embodiment of the invention;

FIG. 7E is a perspective view of the folding camper illustrated in FIGS. 7A-7D with the rear panel deployed upwardly with respect to the base frame to close one end of the folding camper; and FIG. 7F is a perspective view of the folding camper illustrated in FIGS. 7B-7E, illustrating the rear panel deployed upwardly with respect to the base frame to close the opposite end of the folding camper.

DESCRIPTION OF THE PREFERRED EMBODIMENTS

Referring initially to FIGS. 1, 3, 4 and 6 of the drawings, the folding camper of this invention is generally illustrated by reference numeral 1. The folding camper 1 is deployed in the pick-up truck bed 43 of a pick-up truck 42 having conventional bed sides 44 and a cab 46, with a rear cab window 47, as illustrated in FIG. 1. The folding camper 1 is further characterized by a generally rectangular-shaped base frame 9 which is configured to fit in the pick-up truck bed 43, as further illustrated in FIG. 1. The base frame 9 can be secured to the bed sides 44 by means of base frame mount bolts 23, as illustrated in phantom in FIG. 3, or otherwise, as desired and further includes a base frame floor panel 20, designed to lie flat on the floor panel (not illustrated) of the pick-up truck bed 43. A pair of base frame bed panels 19 define opposite parallel sides of the base frame 9 and extend upwardly from fixed attachment to the edge, respectively, of the base frame floor panel 20, as illustrated in FIG. 6. An extension rear panel 12 closes the rear end of the base frame 9 and spans corresponding ends of the base frame base panels 19, as further illustrated in FIG. 6. A base frame door opening 16 is provided in the extension rear panel 12 and a base frame door 13 is designed to close the base frame door opening 16 by means of spaced base frame door hinges 15, which are attached to one edge of the base frame door opening 16, respectively. An optional base frame door latch 14 may be provided in the base frame door 13 for opening the base frame door 13 on the base frame door hinges 15 and providing access to the interior of the base frame 9. Alternatively, a suitable latch mechanism (not illustrated) can be provided inside the base frame 9 in cooperation with the base frame door 13 and the extension rear panel 12, to facilitate securing the base frame door 13 in the base frame door opening 16 from the inside of the base frame 9, when the folding camper 1 is deployed, as hereinafter further described. A base frame front panel 17 spans the opposite ends of the base frame bed panels 19 and extends substantially parallel to the extension rear panel 12 to close the front end of the base frame 9. A pair of base frame base panels 18 extend outwardly in a common horizontal plane from fixed attachment to the base frame bed panels 19, respectively. A pair of upward-standing extension side panels 11 are mounted on the extending edges of the base frame base panels 18 and are secured to cooperating outwardly-disposed extensions of the extension rear panel 12 and base frame front panel 17, respectively, to define the base frame extensions 10, as further illustrated in FIG. 6. A bed panel spacer 22 extends between the base frame bed panels 19 near the center of the base frame 9, in order to define a bed area which includes the area between the bed panel spacer 22 and the base frame front panel 17.

Referring now to FIGS. 3, 4 and 6 of the drawings, in a most preferred embodiment of the invention a generally triangular-shaped front panel 24, having front panel edges 29 joining at a front panel apex 30, is hinged along the front panel base 27 to the top edge of the base frame front panel 17 by means of front panel hinges 25 and is designed to fold inwardly of the base frame 9 to rest on the bed panel spacer 22. Similarly, a generally triangular-shaped rear panel 32 is hinged along the rear panel base 37 to the top edge of the extension rear panel 12 by means of rear panel hinges 33, with the rear panel apex 40, joining the rear panel edges 39, nestled against the front panel 24 when the rear panel 32 is folded inwardly of the base frame 9. As illustrated in FIG. 4, the base frame front panel 17 is about 2 inches shorter than the extension rear panel 12, in order to accommodate the front panel 24 and rear panel 32, together with optional insulation and/or siding (not illustrated) which may be provided thereon, in flat, horizontally stacked configuration. In like manner, the left-hand roof panel 2 is hinged along the base edge 2a thereof to the left-hand extension side panel 11 by means of multiple, spaced left-hand roof panel hinges 3 and is designed to fold inwardly of the base frame 9 on top of the folded rear panel 32. Furthermore, the base edge 5a of a right-hand roof panel 5 is hingedly attached to the top edge of the opposite or right-hand extension side panel 11 by means of multiple, spaced right-hand roof panel hinges 6 and is designed to fit flat against the left-hand roof panel 2 when the right-hand roof panel 5 is folded inwardly of the base frame 9. Horizontal folding of the right-hand roof panel 5 in horizontally stacked relationship on the left-hand roof panel 2 is facilitated, since the left-hand extension side panel 11 is about 2 inches shorter than the right-hand extension side panel 11, as illustrated in FIG. 3. This 2-inch difference in length between the respective extension side panels 11 allows the installation of optional insulation (not illustrated) and/or exterior siding (not illustrated) on the left-hand roof panel 2 and right-hand roof panel 5, as deemed necessary. In a most preferred embodiment of the invention, the upper or ridge edge 2b of the left-hand roof panel 2 is further characterized by a left-hand roof panel bevel 4, as further illustrated in FIG. 3, in order to engage the companion ridge edge 5b of the right-hand roof panel 5 and facilitate sealing of the apex, or ridge of the folding camper 1 by means of a roof panel seal 7, attached to the ridge edge 5b of the right-hand roof panel 5, as hereinafter further described. Furthermore, as further illustrated in FIG. 4 of the drawings, end panel seals 8 are provided on the side edges of the left-hand roof panel 2 and right-hand roof panel 5, respectively, for sealing the junctions between corresponding front panel edges 29 of the front panel 24 and the left-hand roof panel 2 and right-hand roof panel 5, respectively, as well as the rear panel edges 39 of the rear panel 32 and the left-handed roof panel 2 and right-hand roof panel 5, respectively, further as hereinafter described. As further illustrated in FIG. 6, the front panel 24 includes a front panel window 26 of selected dimension, while the rear panel 32 includes a rear panel door opening 34, designed to receive a rear panel door 35, fitted with a door window 41, by means of rear panel door hinges 36.

Referring now to FIGS. 2 and 7A-7E, in sequence, the folding camper 1 of this invention is deployed as follows. The base frame 9 of the folding camper 1 is first mounted in the pick-up truck bed 43 of a pick-up truck 42 by means of the base frame mount bolts 23, as illustrated in FIGS. 1 and 3. The sequence of deploying the hinged structural elements of the folding camper 1 is illustrated in FIG. 7A-7E, with the folding camper 1 removed from the pick-up truck 42 for clarity. Referring initially to FIG. 7A, the folding camper 1 is illustrated with the front panel 24, rear panel 32, left-hand roof panel 2 and right-hand roof panel 5 in folded configuration, and the right-hand roof panel 5 defining the top surface of the folding camper 1. As illustrated in FIG. 7B, the first step in deploying the folding camper 1 is to raise the right-hand roof panel 5 in the direction of the arrow and support the right-hand roof panel 5 in raised configuration by means of the support rod 21, the free end of which is extended from pivotal attachment to the right-hand roof panel 5 to a support rod bracket 31, mounted on the extension rear panel 12, as illustrated. The left-hand roof panel 2 is then pivoted upwardly in the direction of the arrow as illustrated in FIG. 7C and the support rod 21 is then removed from engagement with the support rod bracket 31, to facilitate joining the extending ridge edge 2b of the left-hand roof panel 2 and the ridge edge 5b of the right-hand roof panel 5, as further illustrated in FIG. 7D. It will be appreciated that the extending ridge edges 2b and 5b of the left-hand roof panel 2 and right-hand roof panel 5 are joined such that the roof panel seal 7, attached to the extending ridge edge 5b of the right-hand roof panel 5, overlaps the ridge junction. Referring now to FIG. 7E of the drawings, the rear panel 32 is then pivoted upwardly in the direction of the arrow on the rear panel hinges 33 from a point of acces beneath the left-hand roof panel 2 and right-hand roof panel 2, as more particularly illustrated in FIG. 6, into the position illustrated in FIG. 2, to define a rear panel match line 38. Accordingly, it will be appreciated from a consideration of FIGS. 2 and 7E, that the rear panel sides 39 of the rear panel 32 engage the end panel seals 8 provided on the edges of the left-hand roof panel 2 and right-hand roof panel 5, respectively, in order to seal these junctions from inclement weather. Furthermore, the rear panel door 35, located in the rear panel 32, is thusly vertically aligned with the base frame door 13, provided in the extension rear panel 12, such that the rear panel door 35 can be locked to the base frame door 13 by a suitable locking or latching mechanism (not illustrated) to facilitate opening and closing the rear panel door 35 and the base frame door 13 in concert, pursuant to operation of the optional base frame door latch 14. Referring now to FIG. 7F of the drawing, the front panel 24 is then pivoted upwardly from its resting position on the bed panel spacer 22 and the panel latches 45 are manipulated into corresponding receptacles (not illustrated) provided in the left-hand roof panel 2 and right-hand roof panel 5, to close the front end of the folding camper 1 along the front panel match line 28. The front panel sides 29 are then sealed against the companion edges of the left-hand roof panel 2 and the right-hand roof panel 5, respectively, by means of additional end panel seals 8, attached to these edges.

When the folding camper 1 is deployed according to the steps outlined in FIGS. 7A-7F, it is configured as illustrated in FIGS. 2 and 5 of the drawings. Since all of the junctions between the left-hand roof panel 2, right-hand roof panel 5, front panel 24 and rear panel 32 are sealed by means of the roof panel seal 7 and the end panels seals 8, respectively, the folding camper 1 is protected from the intrusion of wind or water. Furthermore, the folding camper 1 is easily accessed by operating the optional base frame door latch 14 to open the rear panel door 35 and the base frame door 13 in concert, as further illustrated in FIG. 2, and ventilation is accomplished by opening the front panel window 26 and/or the door window 41. It is understood that the rear panel 32 is fitted with panel latches such as the panel latches 45, illustrated in FIG. 7F, to secure the rear panel 32 in position. These panel latches 45 are typically of the bolt and receiver design, but any suitable latch known to those skilled in the art may be used, as desired.

Referring again to FIG. 2 of the drawings, while the base frame door latch 14 may be provided in the base frame door 13 with or without a lock, the base frame door latch is preferably provided with a lock, or a separate lock (not illustrated) may be provided in the base frame door 13 to secure the base frame door 13 and the rear panel door 35 in closed configuration for maximum personal security.

It will be appreciated by those skilled in the art that the folding camper of this invention offers a number of advantages not found in prior art campers. For example, the four basic folding components are simple in design and can be deployed or closed in less than 30 seconds, and when in closed, transportation mode, cause very little wind resistance and result in little or no rearward visual restriction. When deployed or folded, the folding camper is water-proof and wind-proof and suitable insulation and wiring, as well as exterior siding or cladding can be added, as desired. Furthermore, access to the interior of the base frame 9 is afforded by means of the base frame door 13 when the folding camper is in folded, transportation mode, as illustrated in FIG. 2 of the drawing.

It will be further appreciated that various materials of construction can be used in the folding camper 1, as desired. However, a suitable material for construction of the left-hand roof panel 2, right-hand roof panel 5, front panel 24 and rear panel 32, is ½ inch plywood and the base frame 9 is constructed of pine lumber and plywood. Rigid polystyrene board insulation having a thickness of 1⅜ inches is glued or otherwise attached to the plywood panels and ½ inch wall framing is used to border the plywood panels. The interior surface of the left-hand roof panel 2, right-hand roof panel 5, front panel 24 and rear panel 32 is covered with 3/16 inch paneling. The exterior surface of these components is covered by rough cedar siding, applied in 4×8 foot sheets, by nailing. The roof panel seal 7 and end panel seals 8 are constructed of 22 gauge galvanized iron and the left-hand roof panel hinges 3, right-hand roof panel hinges 6, front panel hinges 25 and rear panel hinges 33 are piano hinges, respectively.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A folding camper for pick-up trucks comprising a base frame adapted to fit in the bed of a pick-up truck; a front panel hingedly carried by one end of said base frame, aids front panel foldable on said base frame in travel configuration and pivotable upwardly from said base frame in deployed configuration; a rear panel hingedly carried by the opposite end of said base frame opposite said front panel, said rear panel foldable on said front panel in said travel configuration and pivotable upwardly from said base frame in substantially parallel relationship with respect to said front panel in said deployed configuration; a base frame door provided in said rear panel of said base frame and a rear panel door provided in said rear panel, said rear panel door disposed in substantially vertical alignment with said base frame door when said rear panel is pivoted into said deployed configuration; a left-hand roof panel hingedly carried by one side of said base frame and spanning said front panel and said rear panel, said left-hand roof panel foldable on said rear panel in said travel configuration and pivotable upwardly for engaging first corresponding sides of said front panel and said rear panel, respectively, when said left-hand roof panel is disposed in said deployed configuration; and a right-hand roof panel hingedly carried by the opposite side of said base frame and spanning said front panel and said rear panel, said right-hand roof panel foldable on said left-hand roof panel in said travel configuration and pivotable upwardly for engaging said left-hand roof panel and engaging second corresponding sides of said front panel and said rear panel, respectively, and closing said folding camper when said right-hand roof panel is pivoted into said deployed configuration.

2. The folding camper of claim 1 further comprising latch means provided in said base frame door and said rear panel door, whereby said rear panel door and said base frame door are selectively joined and opened and closed in convert by manipulating said latch means.

3. The folding camper of claim 1 further comprising a door window provided in said rear panel door.

4. The folding camper of claim 1 further comprising a front panel window provided in said front panel.

5. The folding camper of claim 1 further comprising:
 (a) a door window provided in said rear panel door; and
 (b) a front panel window provided in said front panel.

6. The folding camper of claim 1 further comprising seal means carried by said left-hand roof panel and said right-hand roof panel for sealing the seams of contact between said left-hand roof panel and said right-hand roof panel, between said rear panel, said left-hand roof panel and said right-hand roof panel and between said front panel, said left-hand roof panel and said right-hand roof panel, respectively.

7. The folding camper of claim 6 further comprising a base frame door provided in said rear panel of said base frame and a rear panel door provided in said rear panel, said rear panel door disposed in substantially vertical alignment with said base frame door when said rear panel is pivoted into said deployed configuration., first latch means provided in said base frame door and said rear panel door, whereby said rear panel door and said base frame door can be selectively joined; and access latch means provided in said base frame door, whereby said rear panel door and said base frame door can be opened and closed in concert by manipulating said access latch means.

8. The folding camper of claim 7 further comprising a door window provided in said rear panel door.

9. The folding camper of claim 8 further comprising a front panel window provided in said front panel.

10. The folding camper of claim 9 wherein said seal means further comprises a roof panel seal carried by a selected one of said left-hand roof panel and said right-hand roof panel for sealing the line of contact between said left-hand roof panel and said right-hand roof panel and end panel seals carried by the side edges of said left-hand roof panel and said right-hand roof panel, respectively, for sealing the lines of contact between said left-hand roof panel, said front panel and said rear panel and between said right-hand roof panel, said front panel and said rear panel, respectively.

11. A folding camper for pick-up trucks comprising a generally rectangular-shaped base frame adapted to fit in the bed of a pick-up truck; a generally triangular-shaped front panel hingedly coupled to one end of said base frame, said front panel selectively foldable on said base frame in travel configuration end pivotable upwardly from said base frame in deployed configuration and pivotable upwardly from said base frame in deployed configuration; a generally triangular-shaped rear panel hingedly coupled to the opposite end of said base frame opposite said front panel, said rear panel selectively foldable on said front panel in said travel configuration and pivotable upwardly from said base frame in substantially parallel relationship with respect to said front panel in said deployed configuration a base frame door provided in said rear panel of said base frame and rear panel door provided in said rear panel, said rear panel door disposed in substantially vertical alignment with said base frame door when said rear panel is pivoted into said deployed configuration and latch means provided in said base frame door and said rear panel door, whereby said rear panel door and said base frame door may be selectively joined and opened and closed in concert by manipulating said latch means; a left-hand roof panel hingedly coupled to one side of said base frame and spanning said front panel and said rear panel, said left-hand roof panel selectively foldable on said rear panel in said travel configuration and pivotable upwardly in angular relationship with respect to said base frame, for engaging first corresponding sides of said front panel and said rear panel, respectively, when said left-hand roof panel is disposed in said deployed configuration; and a right-hand roof panel hingedly coupled to the opposite side of said base frame and spanning said front panel and said rear panel, said right-hand roof panel selectively foldable on said left-hand roof panel in said travel configuration and pivotable upwardly in angular relationship with respect to said base frame, for engaging said left-hand roof panel and engaging second corresponding sides of said from panel and said rear panel, respectively, and closing said folding camper in a substantially A-frame orientation when said right-hand roof panel is disposed in said deployed configuration.

12. The folding camper of claim 11 further comprising a door window provided in said rear panel door.

13. The folding camper of claim 11 further comprising a front panel window provided in said front panel.

14. The folding camper of claim 11 further comprising:
 (a) a door window provided in said rear panel door; and
 (b) a front panel window provided in said front panel.

15. The folding camper of claim 11 further comprising seal means carried by said left-hand roof panel and said right-hand roof panel for sealing the seams of contact between said left-hand roof panel and said right-hand roof panel, between said rear panel, said left-hand roof panel and said right-hand roof panel and between said front panel, said left-hand roof panel and said right-hand roof panel, respectively.

16. The folding camper of claim 15 wherein said seal means further comprises a roof panel seal carried by said right-hand roof panel for sealing the line of contact between said left-hand roof panel and said right-hand roof panel and end panel seals carried by the side edges of said left-hand roof panel and said right-hand roof panel, respectively, for sealing the lines of contact between said left-hand roof panel, said front panel and said rear panel and between said right-hand roof panel, said front panel and said rear panel, respectively.

17. The folding camper of claim 16 wherein said latch means further comprises first latch means provided in said base frame door and said rear panel door, whereby said rear panel door and said base frame door can be selectively joined, and access latch means provided in said base frame door, whereby said rear panel door and said base frame door can be opened and closed in concert responsive to manipulation of said access latch means.

18. A folding camper for pick-up trucks comprising a generally rectangular-shaped base frame adapted to fit in the bed of a pick-up truck; a generally triangular-shaped front panel hingedly connected to one end of said base frame said front panel selectively foldable on said base frame in travel configuration and pivotable upwardly form said base frame in deployed configuration; a generally triangular-shaped rear panel hingedly connected to opposite end of said base frame opposite said front panel, said rear panel selectively foldable on said front panel in said travel configuration and pivotable upwardly from said base frame in substantially parallel relationship with respect to said front panel in said deployed configuration; a base frame door provided in said rear panel of said base frame and a rear panel door provided in said rear panel, said rear door disposed in substantially vertical alignment with said base frame door when said rear panel is pivoted into said deployed configuration and latch means provided in said base frame door and said rear panel door, whereby said rear panel door and said base frame door can be selectively joined and opened and closed in concert by manipulating said latch means; a door window provided in said rear panel door a front panel window provided in said front panel; a generally rectangular-shaped left-hand roof panel hingedly connected to one side of said base frame and spanning said front panel and said rear panel, said left-hand roof panel selectively foldable on said rear panel in said travel configuration and pivotable upwardly in angular relationship with respect to said base frame, for engaging first corresponding sides of said front panel and said rear panel, respectively, when said left-hand roof panel is disposed in said deployed configuration; a generally rectangular-shaped right-hand roof panel hingedly connected to the opposite side of said base frame and spanning said front panel and said rear panel, said right-hand roof panel selectively foldable on said left-hand roof panel in said travel configuration and pivotable upwardly in angular relationship with respect to said base frame, for engaging said left-hand roof panel and second corresponding sides of said front panel and said rear panel, respectively, and closing said folding camper in an A-frame orientation when said right-hand roof panel is pivoted into said deployed configuration.

19. The folding camper of claim 17 further comprising seal means carried by said left-hand roof panel and said righthand roof panel for sealing the seals of contact between left-hand roof panel and said right-hand roof panel, between said rear panel, said left-hand roof panel and said right-hand roof panel and between said front panel, said left-hand roof panel and said right-hand roof panel, respectively.

20. The folding camper of claim 19 wherein said latch means further comprises first latch means provided in said base frame door and said rear panel door, whereby said rear panel door and said base frame door can be selectively joined, and access latch means provided in said base frame door, whereby said rear panel door and said base frame door can be opened and closed in concert responsive to manipulation of said access latch means.

21. The folding camper of claim 20 wherein said seal means further comprises a roof panel seal carried by said right-hand roof panel for sealing the line of contact between said left-hand roof panel and said right-hand roof panel and end panel seals carried by the side edges of said left-hand roof panel and said right-hand roof panel, respectively, for sealing the lines of contact between said left-hand roof panel, said front panel and said rear panel and between said right-hand roof panel, said front panel and said rear panel, respectively.

* * * * *